Mar. 6, 1923.
G. A. BURNHAM.
ELECTRIC SWITCH.
FILED SEPT. 9, 1921.
1,447,642.
2 SHEETS—SHEET 1.
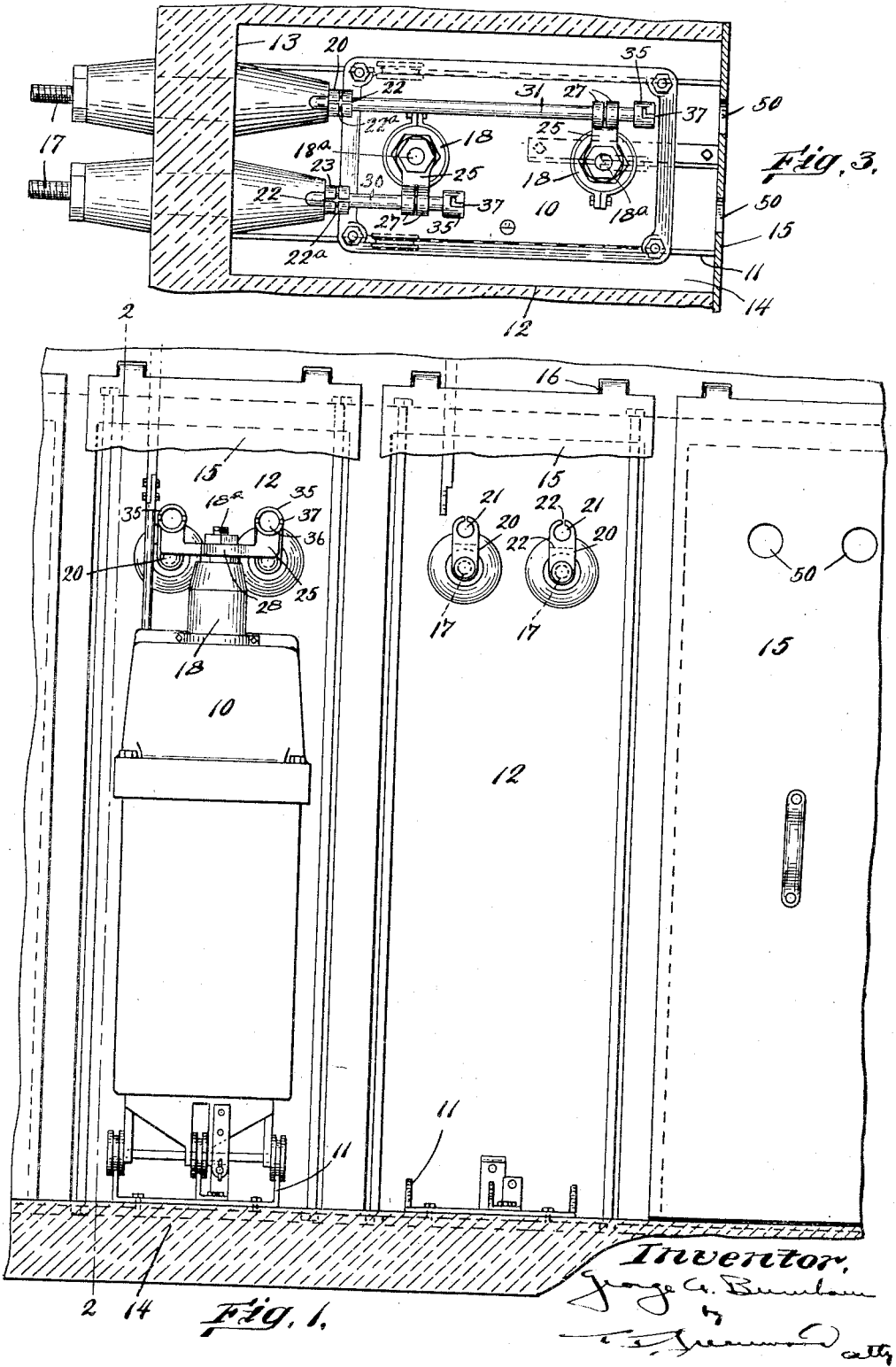

Mar. 6, 1923.
G. A. BURNHAM.
ELECTRIC SWITCH.
FILED SEPT. 9, 1921.
1,447,642.
2 SHEETS—SHEET 2.
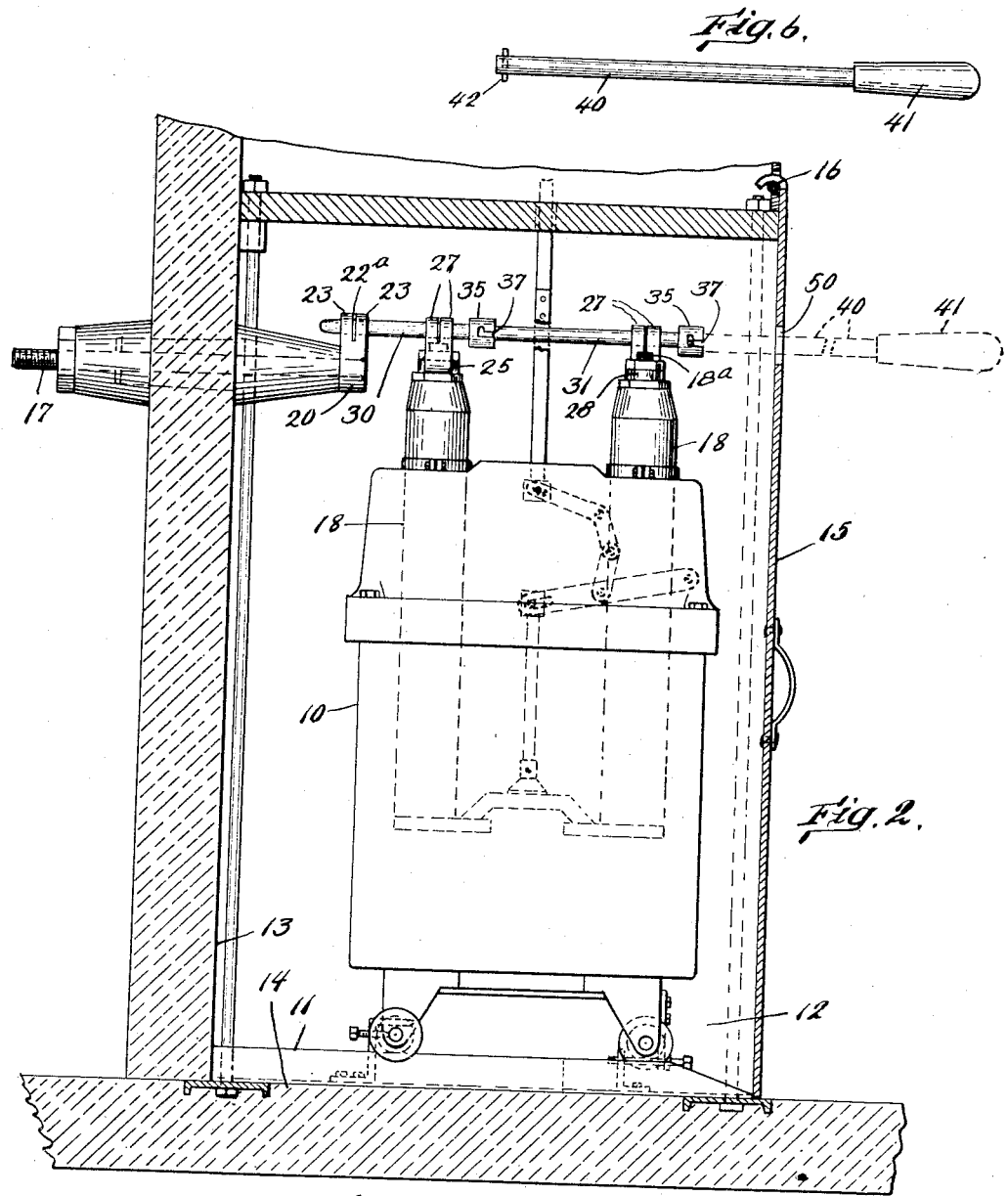
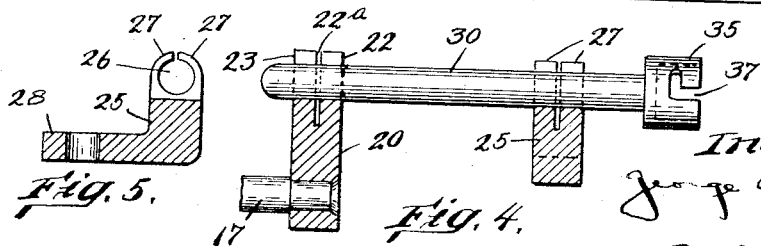

Patented Mar. 6, 1923.

1,447,642

UNITED STATES PATENT OFFICE.

GEORGE A. BURNHAM, OF SAUGUS, MASSACHUSETTS, ASSIGNOR TO SEARS B. CONDIT, OF BROOKLINE, MASSACHUSETTS.

ELECTRIC SWITCH.

Application filed September 9, 1921. Serial No. 499,407.

*To all whom it may concern:*

Be it known that I, GEORGE A. BURNHAM, a citizen of the United States, residing at Saugus, in the county of Essex and State of Massachusetts, have invented an Improvement in Electric Switches, of which the following is a specification.

This invention relates to electric switches and has particular reference to that type of switch adapted to be contained removably in an enclosing cell.

A cell adapted to contain a switch with which this invention is conceived is usually provided with fixed connecting means for the circuit leads and the connection between said fixed connecting means and a stationary switch member of the switch is usually a bar or strap removably secured by bolts to both. When a switch is to be moved from the cell, the bars must be unbolted; and the disconnecting operation requires considerable time and may be attended with considerable danger as the fixed connecting means may be connected with a source of dangerously high potential.

Furthermore, the junction between the connecting bar and the fixed cell connecting means and stationary switch members requires frequent cleaning to maintain a good electrical connection and reduce resistance losses and heating, which may be considerable when the switch is adapted to control circuits of considerable current capacity, as is usually the case. With the usual bar form of connector, the circuit through the switch usually must be interrupted before the cleaning operation can be performed, and it is highly desirable to maintain the continuity of the circuit and not interrupt the circuit except through a necessary operation of the switch.

An object of this invention is to provide a switch with connecting means arranged readily to disconnect the switch members from the cell connecting means.

A further object is to provide connecting means, the contacting surfaces of which may be cleaned while maintaining the continuity of the circuit and while carrying current.

My invention may be contained in a cell having fixed or stationarily-supported connecting means for the circuit leads and a switch adapted to be contained removably in said cell having exposed stationary switch-members. Said cell connecting means and switch members may be provided with terminal members having aligned openings therein and connecting rods may be extended through said aligned openings and frictionally fit rotatably in said terminal members and connect said cell connecting means and stationary switch members electrically. Said connecting rods may be provided with wrench-engageable terminal portions adapted to be engaged by a wrench and rotated in their seats to clean the contact surfaces while in electrically connecting position. Said connecting rods may also be arranged to be disconnected from the cell connecting means, and also from the stationary switch members by an axial movement thereof, and from without the cell for the subsequent removal of the switch from the cell.

A further object is generally to improve the construction and operation of an electric switch.

Fig. 1 is a front elevation of a cell structure for a three-phase switching equipment with which my invention is associated.

Fig. 2 is a sectional elevation along line 2—2 of Fig. 1.

Fig. 3 is a top view of Fig. 2.

Fig. 4 is a detail, partly in section, of the terminal members for a cell connecting means and a stationary switch member and the connector extended between said terminal members.

Fig. 5 is a detail, in front sectional elevation, of a terminal member for a stationary switch member.

Fig. 6 is a detail of a wrench adapted for use in connection with the connecting members.

As here shown, a switch unit 10 is adapted to be supported movably on the track 11 in the cell 12 which has the rear wall 13 and bottom wall 14. A door 15 may comprise the front wall of the cell and may pivot about the axis of the pivot pin 16 to admit the movement of the switch into and out of the cell.

Fixed connecting means 17 are carried by the rear wall 13 of the cell and have end-portions extended outwardly beyond said rear wall for connection with circuit leads; and the other ends of said connecting means extend within the cell for connection with the switch. The switch may have the stationary switch members 18 rising from the top wall thereof; and said switch members are adapted to be connected with said cell connecting means.

In accordance with this invention, terminal members 20 are secured to the ends of the fixed cell connecting means disposed within the cell. Each terminal member may comprise a relatively massive block, preferably of copper, having an aperture in one end thereof in which the end of a cell connecting means may be secured. Said terminal member preferably extends upwardly above said cell connecting means and its upper end is formed with an aperture 21 adapted removably to receive rotatably a connecting member hereinafter to be described. Preferably said block, about said aperture 21, is split both longitudinally and transversely by the slots 22 and 22$^a$ to provide the spring fingers 23 which are adapted to engage the connecting member frictionally.

The terminal member 25 for the stationary switch members of the switch are similarly formed, in that said members have the apertures 26 and spring fingers 27, and the lower ends of said members are formed with the offset ears 28 by which said members are secured to the stationary switch members.

The switch terminal members are arranged on the stationary switch members in oppositely offset relation; that is, the apertures 26 in said member lie on opposite sides of the middle line of the switch and said apertures are in line with the corresponding apertures in the terminal member of the cell connecting means.

The means connecting said terminal members may comprise the connecting rods 30 and 31. Said rods are preferably cylindrical and of uniform diameter throughout the major portion of their length, although not necessarily so formed, and are composed of some good conducting material as copper or brass. Said rods are adapted to be extended through the aligned apertures in said cell and switch terminal members and the diameter of said rods is adapted to be substantially equal or slightly greater than the normal diameter of the apertures in said terminal members whereby to be a good friction fit therein; and the spring fingers 23 and 27 of said terminal members are adapted to press against said rods and be in good electrical contact therewith and also frictionally retain said rods in position. Said short rod 30 is adapted to connect the rear stationary switch member with a cell connecting means and said long rod 31 is adapted to perform the same function with said front stationary switch member. It will be noted that the offset relation of the terminal members for the switch members provides for ample spacing and air insulation between said connecting rods. Said switch terminal members preferably may be adjusted in position about the studs 18$^a$ of the switch members whereby to provide for proper alignment of said switch and cell terminal members.

With the arrangement above set forth, the switch may be disconnected from the cell by removing said rods 30 and 31 from position in the apertures in said terminal members. The contact surfaces between said rods and terminal members may be cleaned when desired by rotating, or partially rotating, said rods in said terminal members; and said cleaning operation may be performed while maintaining the connection between said fixed connecting means and said switch members.

Said rods may be formed with enlarged or head portions 35 which have the internal recesses 36 and the bayonet slots 37 therein by which the rods may be engaged by a suitably formed wrench and rotated in or withdrawn from the terminal members. Said wrench may comprise the, preferably, insulating rod 40 having a handle 41 at one end and having its other end suitably shaped to be received within the recesses 36 in said connecting rods. Said latter end of the rod is provided with the pin 42 which extends beyond the rod on opposite sides thereof and is adapted to enter the bayonet slots in said rods.

The door 15 of the cell may be formed with openings 50 disposed to align with said connecting rods and through which the wrench may be passed to engage said connecting rods and through which said rods may be withdrawn to disconnect the switch from the circuit leads.

When it is desired to clean the contact surfaces of said connecting rods, the wrench is inserted through said apertures 50 in the door of the cell and fitted in the head portion of said rods. The pin 42 carried thereby will fit in the bayonet slots in said rods and a rotation or angular movement of said wrench will be transmitted to said rods to rotate them in the apertures in and in frictional engagement with said terminal members and clean the contact surfaces.

The connecting rods may be withdrawn from the terminal members by a combined rotary and axial movement and the recesses in the head ends of said rods may snugly receive the end of the wrench whereby said rods will remain fixed on the end of the wrench while being withdrawn through the openings in the door of the cell.

The invention may be contained in other modifications without departing from the spirit thereof.

I claim:

1. The combination of fixed connecting means, an electric switch having stationary switch members, and means arranged to connect said fixed connecting means and switch members electrically and admit of the cleaning of the contact surfaces while maintaining the electrical connection therebetween.

2. The combination of a fixed connecting means, an electric switch having a stationary switch member and a connector arranged to connect said fixed connecting means and switch member electrically and be rotatable in its connections.

3. The combination of a fixed connecting means, an electric switch having a stationary switch member and means to connect said fixed connecting means and switch member removably including a connecting member arranged for removable frictional engagement with both said fixed connecting means and switch member.

4. The combination of a fixed connecting means, an electric switch having a stationary switch member and means to connect said fixed connecting means and switch member removably including a connecting member arranged for rotatable frictional engagement with both said fixed connecting means and switch member.

5. The combination of a fixed connecting means, an electric switch having a stationary switch member and means to connect said fixed connecting means and switch member removably including terminal members carried by said fixed connecting means and switch member having aligned apertures therein and a connecting rod arranged removably to be received frictionally in said apertures.

6. The combination of a fixed connecting means, an electric switch having a stationary switch member and means to connect said fixed connecting means and switch member removably including terminal members carried by said fixed connecting means and switch member having aligned apertures therein, and a connecting rod arranged removably to be received frictionally in said apertures said rod having means at its end for detachable engagement with a wrench.

7. The combination of two fixed connecting means, an electric switch having two stationary switch members arranged in line in front of said fixed connecting means, and means to connect said fixed connecting means and switch members removably including terminal members carrier by said switch members each having an aperture therein, said terminal members arranged with the apertures therein disposed on opposite sides of the switch, terminal members carried by said fixed connecting means having apertures therein arranged to align with the apertures in said switch terminal members, and connecting rods arranged removably to be received frictionally in said aligned apertures.

8. The combination of a cell including a rear wall and a door, an electric switch contained removably within the cell between said wall and door, fixed connecting means carried by said rear wall, stationary switch members carried by said switch and means removably to connect said cell connecting means and switch members electrically including connecting rods extended between and in frictional rotatable engagement with said cell connecting means and switch members, said connecting rods having wrench engageable end portions, and said door formed with apertures therein arranged to align with said connecting rods to admit the insertion of a wrench for engagement with said connecting rods.

9. The combination of a cell including a rear wall and a door, an electric switch removably contained within the cell between the rear wall and door, fixed connecting means carried by a cell wall, switch members carried by the switch, and connectors extended between and connecting said fixed connectors and switch members arranged to be disconnected therefrom from a position without the cell.

10. The combination of a cell including a rear wall and a door, an electric switch removably contained within the cell between the rear wall and door, fixed connecting means carried by a cell wall, switch members carried by the switch, and connectors extended between and connecting said fixed connectors and switch members rotatably and arranged to be rotated in electrical connection therewith from a position without the cell.

11. The combination of two fixed connecting means arranged in horizontal spaced relation, an electric switch arranged in front of said fixed connecting means, two switch members carried by said switch arranged in tandem relation with said fixed connecting means, terminal members carried by said switch members having apertures disposed on opposite sides of the switch, terminal members carried by said fixed connecting members having apertures to align each with the aperture in one of said switch terminal members, a short connecting rod extended through and rotatably received in the aperture in the rear switch terminal member and the aperture in the corresponding terminal member of one of said fixed connecting means, and a long connecting rod extended through and rotatably received in the aperture in the front switch terminal member and the aperture in the corresponding terminal member of the other of said fixed connecting means.

In testimony whereof, I have signed my name to this specification.

GEORGE A. BURNHAM.